Jan. 16, 1968 J. B. WIGGILL 3,364,187
HALOGENATION OF OLEFIN/UNSATURATED CARBOXYLIC
ACID AND DERIVATIVES THEREOF BY KNEADING
Filed Dec. 30, 1964
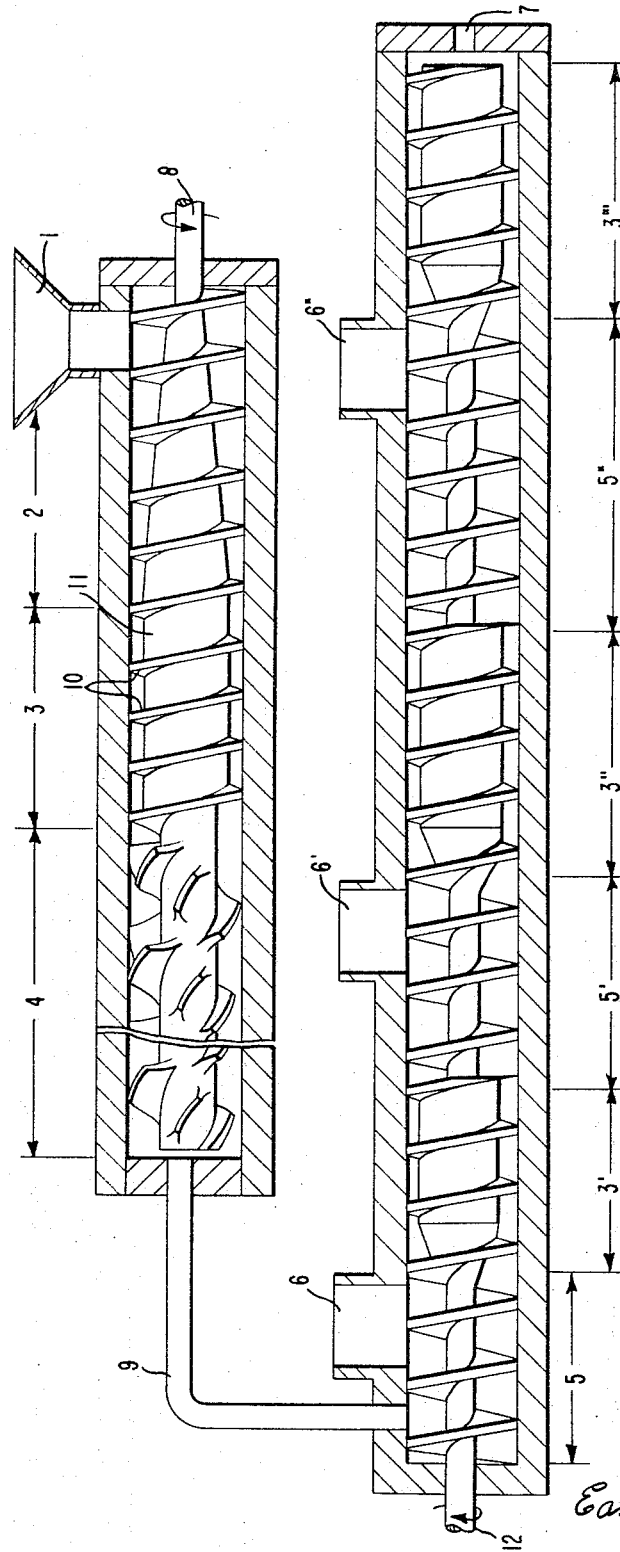
INVENTOR
JOHN BENTLEY WIGGILL
ATTORNEY

United States Patent Office 3,364,187
Patented Jan. 16, 1968

3,364,187
HALOGENATION OF OLEFIN/UNSATURATED CARBOXYLIC ACID AND DERIVATIVES THEREOF BY KNEADING
John Bentley Wiggill, Wilmington, Del., assignor to E. I. du Pont de Nemours and Company, Wilmington, Del., a corporation of Delaware
Filed Dec. 30, 1964, Ser. No. 422,132
12 Claims. (Cl. 260—88.1)

This invention relates to the process of producing hydrocarbon copolymers containing acyl halide groups.

It is known in the art to produce hydrocarbon copolymers containing acyl halide groups by, for example, dissolving a copolymer of ethylene and methacrylic acid in a solvent and adding a halogenating agent. See Belgian Patent No. 643,030, issued July 27, 1964, to D. E. Maloney.

The process of the present invention provides a more economicaly attractive process for the preparation of hydrocarbon copolymers containing acyl halide groups.

This invention comprises kneading together a hydrocarbon copolymer containing units obtained by addition polymerization of alpha, beta ethylenically unsaturated carboxylic acids, a halogenating agent, and in the preferred embodiment, an amine type catalyst. The kneading action brings the halogenating agent into intimate physical contact with the copolymer. The intimate physical contact results in a chemical reaction which converts the acid groups of the copolymer to acyl halide groups. The polymer is then separated from the other reaction products.

The figure shows an extruder system suitable for carrying out the process. The figure is a side elevation view partly in cross-section.

The hydrocarbon copolymers which may be modified by the process of the present invention comprise units formed by addition polymerization of at least one alpha olefin, said units having the general formula

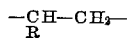

where R is a radical selected from the class consisting of hydrogen and hydrocarbyl radicals having one to eight carbon atoms and units formed by addition polymerization of at least one alpha, beta ethylenically unsaturated carboxylic acid having one to two carboxylic acid groups. Preferably, the alpha, beta ethylenically unsaturated carboxylic acid unit has 3 to 8 carbon atoms. The concentration of the alpha olefin unit in the polymer is at least 50 mol percent and preferably greater than 80 mol percent. The concentration of the alpha, beta ethylenically unsaturated carboxylic acid unit in the copolymer is 0.2 mol percent to 25 mol percent, preferably from 1 to 10 percent. Specific alpha olefin units useful in the copolymers include: ethylene, propylene, butene-1, styrene, pentene-1, hexene-1, heptene-1,3 methylbutene-1, 4 methyl-butene-1, and butadiene. Specific alpha, beta ethylenically unsaturated carboxylic acid units useful in the copolymers include: acrylic, methacrylic, ethacrylic, itaconic, maleic, fumaric, monoesters of dicarboxylic acid such as ethyl hydrogen fumarate, and maleic anhydride. Maleic anhydride and other alpha, beta ethylenically unsaturated anhydrides are considered acids for the purposes of the present invention.

The preferred process for preparing the copolymers for use in the process of the present invention is direct copolymerization. This may be achieved by introducing the monomers into a polymerization environment maintained at high pressures, 50 to 3000 atmospheres, and at elevated temperatures, 150 to 300° C., together with a free radical polymerization catalyst. An inert solvent such as water or benzene may be employed in the polymerization environment. Random distribution of carboxylic acid groups in all the polymer molecules is best obtained by direct copolymerization. Particular processes for the production of the copolymers are known in the art and described in the literature.

The copolymers may also be obtained by grafting an alpha, beta ethylenically unsaturated carboxylic acid to a polyolefin base, or by conversion of a copolymer of a polyolefin and a derivative of carboxylic acid to the free acid.

Molecular weight is suitably defined by melt index, a measure of viscosity described in detail in ASTM–D–1238–57T. The melt index of the copolymers preferred in the present invention is within the range of 0.1 to 1000 g./10 minutes.

The acid copolymer need not be a two component polymer. Thus, although the olefin content of the copolymer should be at least 50 mol percent, more than one olefin can be employed to provide the hydrocarbon nature of the copolymer, also more than one alpha, beta ethylenically unsaturated carboxylic acid may be employed. Additionally, any third copolymerizable monomer can be employed in combination with the olefin and the carboxylic acid comonomer. Preferred termonomers are vinyl esters and acrylates, i.e., alkyl acrylates and methacrylates having up to eight carbon atoms, such as vinyl acetate, vinyl propionate, methyl methacrylate and ethyl acrylate. The scope of base copolymers suitable for use in the present invention is illustrated by the following examples:

Ethylene/acrylic acid copolymers, ethylene-methacrylic acid copolymers, ethylene/itaconic acid copolymers, ethylene/methyl hydrogen maleate copolymers, ethylene/maleic acid copolymers, ethylene/acrylic acid/methyl methacrylate copolymers, ethylene/methacrylic acid/methyl methacrylate copolymers, ethylene/itaconic acid/methyl methacrylate copolymers, ethylene/methyl hydrogen maleate/ethyl acrylate copolymers, ethylene/methacrylic acid/vinyl acetate copolymers, ethylene/acrylic acid/vinyl alcohol copolymers, ethylene/propylene/acrylic acid copolymers, ethylene/styrene/acrylic acid copolymers, ethylene/methacrylic acid/acrylonitrile copolymers, ethylene/fumaric acid/vinyl methyl ether copolymers, ethylene/vinyl chloride/ acrylic acid copolymers, ethylene/vinylidene chloride/acrylic acid copolymers, ethylene/vinyl fluoride/methacrylic acid copolymers, ethylene/chlorotrifluoroethylene/methacrylic acid copolymers, ethylene/methacrylic acid/acrylic acid copolymers, and ethylene/methacrylic acid/maleic anhydride copolymers.

Since it is often desirable to employ the minimum amount of energy to effect the kneading step, the temperature of the polymer being treated may be raised to at least its softening point, thus reducing the viscosity of the polymer, or suitable amounts of a plasticizing solvent may be added to reduce the viscosity of the polymer. Specific solvents found useful for this purpose include carbon tetrachloride, perchloroethylene, benzene, cyclohexane, toluene, methylene chloride, and trichloroethylene. The amount of solvent that may be added depends upon the temperature at which the polymer is to be reacted and upon the particular polymers that are to be reacted.

The kneading step may be carried out in an extruder or a Banbury mixer or using a roll mill. The kneading action of these forms of apparatus include a mixing, shearing, masticating, grinding type of mechanical action. And any other apparatus that yields such kneading action may be employed.

Specific halogenating agents that may be used in the process of this invention include carbonyl chloride, phosphorus trichloride, phosphorus pentachloride, thionyl chloride, oxalyl chloride, phosphorus pentabromide, phosphorus tribomide and perchloroylfluoride. Since it is usually desirable to convert substantially all the acid groups in the copolymer to acyl halide groups, the amount of halogenating agent kneaded into the copolymer should be at least sufficient to react stoichiometrically with the acid groups of the copolymer; however, no advantage is obtained by including more than 200% of the stoichiometric amount.

Specific amine type catalysts that may be added to the feed materials include all of the tertiary amines, and especially pyridine, triethyl amine and trimethyl amine and amides, such as dimethyl formamide. The amount of catalyst added is not critical, but amounts up to 0.5% by weight of the feed materials are beneficial. The use of amime catalysts increases speed of reaction although when $PCl_5$ is the halogenating agent, the speed is already high.

The pressure to which the materials are subjected during the kneading step will vary widely depending on what form of apparatus is used for processing, and depending on the viscosity of the copolymer as it is being kneaded. (The viscosity of the polymer is dependent upon many variables including the temperature of the polymer, the presence or absence of plasticizing solvent, the molecular weight of the copolymer, the presence of reaction byproducts, and the chemical composition of the copolymer.) The pressure may vary from atmospheric pressure to about 5000 p.s.i.

After the copolymer and the halogenating agent have been thoroughly kneaded together, and the halogenating reaction is substantially complete, the resulting reaction mass is preferably treated to separate the polymer. The separation is most readily accomplished by passing the resin through one or more treatments at reduced pressure. If the kneading step has taken place at high pressure and high temperature, then the reduced pressure treatment may be atmospheric pressure or even greater, however, it is preferred to treat the reaction mass under a partial vacuum to accomplish the separation. The temperature during the reduced pressure treatment should be within the range of 70° C. to 200° C. Vacuums of about 28" of mercury are satisfactory. The reduced pressure treatment may be accomplished by passing the reaction mass through an extraction-extruder, in which the reaction mass is passed through alternate zones of low pressure and zones of working which provide a seal. The nonpolymeric constituents are thus vaporized and removed, and a purified polymer product is obtained.

In the following examples which illustrate the invention all parts and percentages are in parts by weight unless otherwise specified.

*Example I*

Using an apparatus such as illustrated in the figure in which the screw was 2 inches in diameter, a copolymer of ethylene-vinyl acetate-methacrylic acid having a melt index of 19.8 g./ 10 minutes as measured by ASTM method D–1238–57T, containing 23.0 weight percent vinyl acetate, and 4.3 weight percent methacrylic acid was fed at the rate of 15 lb./hr. into inlet port 1, along with phosphorus pentachloride at a rate of 2.8 lb./hr. The screw having flights 10 and root 11, was rotated at the rate of 28.6 r.p.m. The materials passed through feed section leading graduall yinto a pumping section 3, the length to diameter ratio of the pumping section was 8.5. The materials passed to a mixing section 4 having a length to diameter ratio of 13.5. In this mixing section most of the acylation reaction took place. The materials then passed through pipe 9 to extraction section 5. The screw 12 was operated at 51.2 r.p.m. This extraction section has a port 6 to which was applied a vacuum of about 27 inches of mercury. HCl and $POCl_3$ were removed at this port. The material then passed through pumping section 3' and into a second extraction section 5'; at extraction port 6' additional HCl and $POCl_3$ were removed with the application of a vacuum of about 28 inches of mercury. The material then passed through pumping section 3" and into extraction section 5". A vacuum of about 28 inches of mercury was applied as port 6" to remove additional HCl and $POCl_3$. The material then passed through pumping section 3''' and out through extrusion die 7.

The products were fed into the extruder at room temperature and were heated to about 93° C. by mechanical working and by heat exchange means, not shown, by the time they reached the end of zone 4. The polymer was as a temperature of about 102° C., when it reached die 7, and it was under a pressure of about 250 p.s.i. The product coming out of die 7 was analyzed by infra red and found to be essentially 100% converted to acyl halide.

*Example II*

Using the apparatus shown in the figure and more fully described in Example I, a terpolymer of ethylene-vinyl acetate-methacrylic acid having a melt index of 27.2 g./10 minutes, and a composition of 22.7 weight percent vinyl acetate units, 7.7 weight percent methacrylic acid units was fed into port 1 at 14 lbs./hr. Screw 8 was rotated at 22 r.p.m. and screw 12 was rotated at 45 r.p.m. Screw 12 exerted a pressure on the polymer of 300 p.s.i. The polymer was at a temperature of 111° C. upon reaching the end of zone 4. Two liquid streams were injected into the beginning of mixing zone 4 through injection ports (not shown). One stream was a solution of thionyl chloride in methylene chloride; this stream was injected at the rate of addition of thionyl chloride of 2.013 lb./hr. (about a 35% excess over stoichiometric). The second stream was a solution of pyridine in methylene chloride which was added as a catalyst at the rate of 1.3 cc. of pyridine per hour.

The reaction mass was subjected to extraction at the ports 6 through 6" under the same conditions as Example I was carried out, except that the temperature was 137° C. and the pressure at the die 7 was 275 p.s.i. The product was analyzed by infra red and showed essentially complete conversion to ethylenevinyl acetate-methacrylyl chloride polymer.

*Example III*

The process of Example I was repeated using the apparatus shown in the figure, except that the copolymer was ethylene-methacrylic acid containing 18.3 weight percent methacrylic acid units. The polymer had a melt index of about 18 g./10 minutes. After the polymer was converted to ethylene-methacrylyl chloride, the product was then subjected to further reaction by passing it through another apparatus as shown in the figure having a 1½ inch screw. 41 parts of 2(o-aminophenyl) benzotriazole per 100 parts by weight of polymer were fed into the mixing zone. The screws were operated at 30 r.p.m. at a temperature of 130° C. and at a pressure of 250 p.s.i. A vacuum of 25 inches of mercury was applied to each of the extraction ports. The throughput was 13 lbs./hr. The product was analyzed by infra red, and showed essentially complete conversion to the amide product. The product was useful as an ultraviolet light stable polymer.

*Example IV*

The process of Eaxmple I may be repeated using $PBr_5$. The temperature in the mixing zone is maintained at 91° C. and in the extraction zone at 110° C.

*Example V*

The process of Example II may be repeated using $PCl_3$ as the halogenating agent and dimethyl formamide as the catalyst.

*Example VI*

The process of Example I may be repeated using $PB_5$ chloride as the halogenating agent and triethyl amine as the catalyst.

The examples show that the copolymer may be at a temperature less than the melting point of the copolymer when it is introduced to the kneading action, and is above the melting point of the copolymer when the kneading action and the chemical reaction are complete. Thus, the kneading action may be carried out at least in part at a temperature below the melting point of the copolymer, and at least in part at a temperature above the melting point of the copolymer. The temperature at which the kneading action is carried out is usually within the range of 30° to 200° C., and often between 80° C. and 130° C.

I claim:
1. A process which comprises subjecting a mixture comprising (a) a copolymer comprising (1) alpha olefin units having the formula

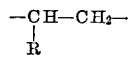

where R is a radical selected from the class consisting of hydrogen and hydrocarbon groups having 1 to 8 carbon atoms and (2) alpha, beta ethylenically unsaturated carboxylic acid units having 3 to 8 carbons, said alpha olefin units being present in the copolymer in the amount of at least 50 mol percent based on the total mols of units polymerized to form the copolymer, said alpha, beta ethylenically unsaturated carboxylic acid units being present in said copolymer to the extent of between 0.1 and 25 mol percent based on the total number of mols of units polymerized to form the copolymer, (b) and a halogenating agent selected from the class consisting of carbonyl chloride, phosphorus trichloride, phosphorus pentachloride, oxalyl chloride, thionyl chloride, phosphorus pentabromide, phosphorus tribromide and perchloroylfluoride, to a kneading action to bring the halogenating agent into intimate physical contact with the copolymer, continuing the kneading action until at least some of the acid groups are converted to acid halide groups.

2. The process of claim 1 in which the kneading is carried out at least in part at a temperature above the melting point of the copolymer.

3. The process of claim 1 in which the kneading is carried out at least in part at a temperature less than the melting point of the copolymer.

4. The process of claim 1 in which an inert solvent for the copolymer is present during the kneading step.

5. The process of claim 1 in which the halogenating agent is phosphorus pentachloride, and in which the temperature at which the kneading action is begun is less than the melting point of the copolymer.

6. The process of claim 1 in which the kneading action is carried out within the temperature range of 30° C. to 200° C., and at atmospheric pressure to 5000 p.s.i.

7. The process of claim 1 in which the mixture is passed through zones of high pressure working and zones of vacuum extraction.

8. The process of claim 1 in which the acid halide copolymer formed by the conversion is subjected to vacuum treatment to remove volatile reaction product.

9. The process of claim 1 in which the amount of halogenating agent present in the mixture is slightly in excess of that necessary to react stoichiometrically with the acid groups of the copolymer.

10. In the process for the production of a copolymer having alpha olefin units of the formula

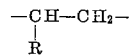

where R is a radical selected from the class consisting of hydrogen and hydrocarbon radicals having 1 to 8 carbon atoms and alpha, beta ethylenically unsaturated acid halide units having 3 to 8 carbon atoms, said alpha olefin units being present in said copolymer to the extent of at least 50 mol percent based on the total mols of units polymerized, said alpha, beta ethylenically unsaturated acid halide units being present in the copolymer to the extent of at least 0.1 mol percent based on the total number of mols of units polymerized, which comprises reacting copolymer having at least 50 mol percent based on the total mols of units polymerized alpha olefin units and at least 0.1 mol percent based on the number of mols of units polymerized alpha, beta ethylenically unsaturated carboxylic acid units with a halogenating agent thereby converting the alpha, beta ethylenically unsaturated carboxylic acid to the acid halide, the improvement which comprises kneading the copolymer containing the alpha, beta ethylenically unsaturated carboxylic acid units with a halogenating agent, and continuing the kneading until at least some of the acid groups of the alpha, beta carboxylic acid units are converted to acid halide groups.

11. Process for the production of hydrocarbon copolymers having pendant acyl halide groups, which comprises feeding a halogenating agent and a hydrocarbon copolymer consisting essentially of alpha olefin units having the formula

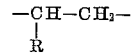

where R is a radical selected from the class consisting of hydrogen and hydrocarbon groups having 1 to 8 carbon atoms and units formed by addition polymerization of alpha, beta ethylenically unsaturated carboxylic acid having 3 to 8 carbon atoms, said alpha olefin units being present in the copolymer in the amount of at least 50 mol percent based on the total mols of units in the copolymer, said units formed by addition polymerization of alpha, beta ethylenically unsaturated carboxylic acid being present in said copolymer to the extent of between 0.1 and 25 mol percent based on the total number of mols of units in the copolymer, into a reaction zone, reacting halogenating agent and copolymer by kneading them together at a temperature between 80° C. and 130° C. and at a temperature between 14 p.s.i. and 5000 p.s.i., then separating the resulting hydrocarbon polymer containing pendant acyl halide groups by subjecting the reaction mass to vacuum extraction at a temperature within the range of 70° C. to 200° C.

12. The process of claim 11 in which the R in the alpha olefin units is hydrogen, and the alpha, beta ethylenically unsaturated carboxylic acid units are polymerized methacrylic acid units.

No references cited.

JOSEPH L. SCHOFER, *Primary Examiner.*

H. WONG, *Assistant Examiner.*

UNITED STATES PATENT OFFICE
CERTIFICATE OF CORRECTION

Patent No. 3,364,187                      January 16, 1968

John Bentley Wiggill

It is hereby certified that error appears in the above numbered patent requiring correction and that the said Letters Patent should read as corrected below.

Column 2, line 29, for "ethylene-methacrylic" read -- ethylene/methacrylic --; line 71, for "tribomide" read -- tribromide --; column 3, line 13, for "amime" read -- amine --; column 4, lines 1 and 8, for "as", each occurrence. read -- at --; line 61, for "Eaxmple" read -- Example --; line 70, for "Example I" read -- Example II --; same line 70, for "PB5" read -- oxalyl --.

Signed and sealed this 3rd day of June 1969.

(SEAL)
Attest:

Edward M. Fletcher, Jr.
Attesting Officer

Commissioner of Patents